United States Patent
Castanon

(10) Patent No.: US 6,736,033 B2
(45) Date of Patent: May 18, 2004

(54) DEVICE FOR THE CONTROL OF THE THRUST FORCE OF A MANUALLY OPERATED PNEUMATIC SCREW DRIVER

(75) Inventor: Gerardo Castanon, Chih (MX)

(73) Assignee: Festo AG & Co., Esslingen (DE)

( * ) Notice: Subject to any disclaimer, the term of this patent is extended or adjusted under 35 U.S.C. 154(b) by 122 days.

(21) Appl. No.: 10/010,256

(22) Filed: Dec. 7, 2001

(65) Prior Publication Data

US 2002/0184973 A1 Dec. 12, 2002

(30) Foreign Application Priority Data

Jun. 7, 2001 (DE) ..................................... 201 09 538 U

(51) Int. Cl.[7] .............................................. B25B 29/00
(52) U.S. Cl. ....................................... 81/57.4; 81/57.24
(58) Field of Search ............................... 81/57.24, 57.4, 81/57.44

(56) References Cited

U.S. PATENT DOCUMENTS 4,562,756 A * 1/1986 Otsuki et al. .................. 81/57.4
4,782,726 A * 11/1988 Ryder et al. .................. 81/57.4
5,109,736 A 5/1992 Dixon

FOREIGN PATENT DOCUMENTS

| DE | 2843080 A1 | 9/1978 |
|---|---|---|
| DE | 8318509 U1 | 6/1983 |
| DE | 9103884 U1 | 3/1991 |
| DE | 4121098 A1 | 6/1991 |

* cited by examiner

Primary Examiner—James G. Smith
(74) Attorney, Agent, or Firm—Hoffman & Baron, LLP

(57) ABSTRACT

A device for controlling the vertical translation of a pneumatic tool includes a drive means and a control means. The pneumatic tool is supported by a holding device which configured to allow the pneumatic tool to be translated in a vertical direction. The pneumatic tool is connected to an air supply line having a pressure associated therewith. The drive means exerts a lifting force on the holding device to support the pneumatic tool. The control means adjusts the lifting force delivered by the drive means and is configured to monitor the pressure in the air supply line.

30 Claims, 1 Drawing Sheet

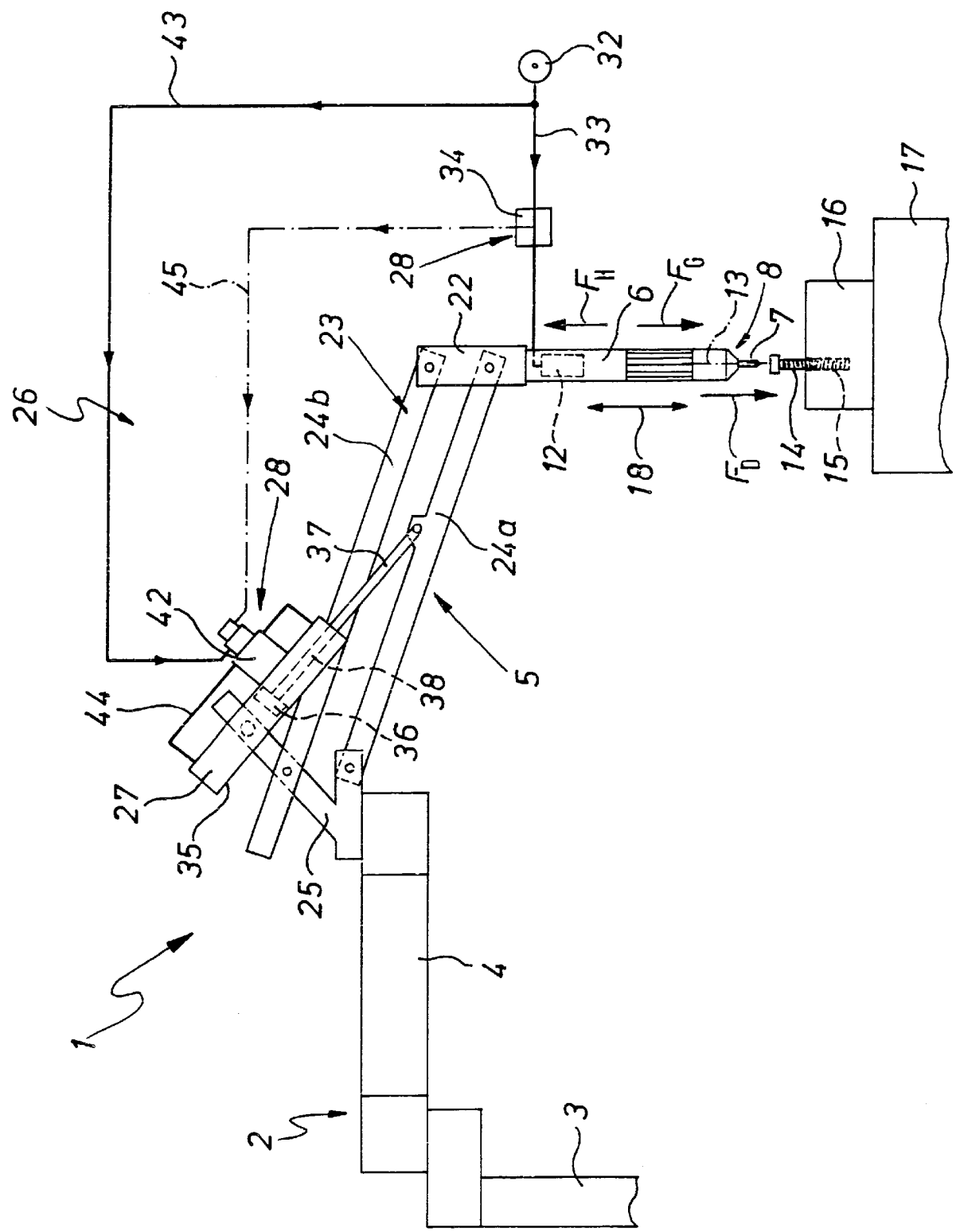

DEVICE FOR THE CONTROL OF THE THRUST FORCE OF A MANUALLY OPERATED PNEUMATIC SCREW DRIVER

BACKGROUND OF THE INVENTION

The invention relates to improvements in the handling of manually operated pneumatic screw drivers.

During the manufacture and assembly of products screw driving operations are frequently necessary, which are performed by the use of manually operated pneumatic screw drivers. Such pneumatic screw drivers are screw driving devices fitted with a compressed air motor and which may be operated using compressed air as a source of energy. The switching on and off of the pneumatic motor takes place manually, as for instance by the actuation of a switch on applying the pneumatic screw driver to a screw to be driven into the work.

It is convenient for the pneumatic screw driver to be suspended on a holding device, which is fitted with a drive means, which is able to produce a lifting force opposing the weight force of the pneumatic screw driver.

It is in this manner that the pneumatic screw driver is suspended in a floating manner and may be drawn downward onto the work to be screwed without any great exertion.

While this type of manually operated pneumatic screw driver does possess many advantages, there are some disadvantages as well. Thus driving in a screw is extremely fatiguing, more particularly owing to the repetitive nature of the operation, and may lead to arm and back pain, something which tends to make for operator negligence, this in turn ultimately leading to a loss in work quality.

SHORT SUMMARY OF THE INVENTION

One object of the invention is to facilitate and simplify the handling of a pneumatic screw driver when performing screwing operations.

In order to achieve these and/or other objects appearing from the present specification, claims and drawings, in the present invention a device for the control of the thrust force of a manually operable screw driver suspended by means of a holding means in a vertically moving manner comprises a drive means for applying a lifting force opposing the weight force of the pneumatic screw driver and control means adapted to cause a reduction or switching off of the lifting force due to the drive means responsive to a certain drop in the operating pressure for the pneumatic screw driver.

Accordingly for screw driving operations may be performed extremely ergonomically with no operator fatigue, something which leads to high quality products despite long periods on the job. The invention is based on the discovery that during the operation of a pneumatic screw driver the operating pressure supplied to it is subject to a slight drop, which is detected by the control means and may be employed as a trigger to reduce the lifting force caused by the drive means or even to switch it off completely.

The result of this is that directly after putting it into operation of the pneumatic screw driver the weight force thereof and possibly the weight forces loading the pneumatic screw driver of the holding device are no longer compensated so that the thrust force, with which the pneumatic screw driver is thrust downward against the screw to be driven, is increased substantially without the application of force by the operator. In the case of a complete switching off of the lifting force the pneumatic screw driver will be urged with its entire weight force against the screw to be driven so that the operator is substantially relieved. If it is a question of a pneumatic screw driver which is activated by being thrust against the screw with a certain force, the system may be so set that the operator only has to apply the thrust force necessary for activation during the entire screwing operation, whereas the greater thrust force necessary for the screw driving operation is then provided by the system.

Further advantageous developments of the invention are defined in the claims.

After the termination of a screwing operation and deactivating of the pneumatic screw driver the operating pressure will immediately rise to the initial value. The control means are preferably able to cause a renewed increase or a renewed switching to a higher value of the lifting force is responsive to such a pressure increase so that after switching off of the pneumatic screw driver the same conditions will obtain as before putting it into operation. The vertical motion of the pneumatic screw driver is therefore aided to the required degree after stabilization of the operating pressure.

For the detection of the drop in pressure the control means will preferably comprise a pressure sensor which is placed in the air supply line supplying compressed air to the pneumatic screw driver for the operation thereof. In this respect the pressure sensor may be provided both in the line component extending outside and also inside the pneumatic screw driver. More particularly, there is also possibility of integrating the pressure sensor directly on the pneumatic screw driver or in the same.

As a drive means a single acting or a double acting power cylinder is more particularly provided, in the case of which it is preferably a question of a pneumatic cylinder. It comprises a working chamber able to receive a drive fluid and more particularly compressed air, for causing the lifting force, the control means comprising a control valve means, which in a fashion dependent on the pressure level of the operating pressure influence the pressure obtaining in the working chamber.

It is preferred for the control means to be coupled with a pressure sensor to cooperate therewith to produce a control function, said pressure sensor being placed in the air line supplying the pneumatic screw driver with the operating pressure so that it is operated in a manner dependent on the signal produced by the pressure sensor.

The control valve means may comprise a pressure regulator. Same may be more particularly employed to adjustably set the degree of reduction of the lifting force.

Preferably, the pneumatic screw driver is arranged on a parallelogram linkage in the holding device and is seated more particularly on a receiving means which may be lowered and lifted without changing its spatial orientation so that the pneumatic screw driver as well will always have the same alignment.

Further advantageous developments and convenient forms of the invention will be understood from the following detailed descriptive disclosure of one preferred embodiment of a control device designed for a manually operated pneumatic screw driver in conjunction with the single figure of the accompanying diagrammatic drawing.

The FIGURE is a general view of an instrumentality 1 employed in manufacture and assembly technology for the production of screwed connections or joints.

DETAILED ACCOUNT OF WORKING EMBODIMENT OF THE INVENTION.

The instrumentality 1 possesses a diagrammatically indicated carrier device 2 provided with an attachment part 3 by way of which it may be stationarily set at the point of application of the instrumentality 1, as for instance on the ground on a wall.

A boom 4 is pivotally mounted on the attachment part 3 and can have one or more joints or bearings so that it may be deflected vertically, that is to say in the drawing at a right angle to the plane of the same.

Near the free end of the boom 4 of the carrier device 2 a holding device 5 is arranged, on which a manually operated pneumatic screw driver 6 is held, such screw driver more particularly being mounted detachably on the holding device 5.

In the working embodiment illustrated the pneumatic screw driver 6 has an elongated shape and is designed in the form of a rod. It is so fixed on the holding device 5 that its front side 8, which is provided with a screw driver bit 7, faces vertically downward.

This pneumatic screw driver 6 is provided with a compressed air or pneumatic motor 12, which is more particularly in the form of a vane motor. The motor can drive the screw driver bit 7 to perform a rotary movement about its longitudinal axis 11. The direction of rotation depends on whether the pneumatic screw driver 6 is to screw or unscrew a screw 14 in or out of a thread 15 in a component 16.

Normally the respective component 16 is so placed on a rest 17 or aligned in some other manner that the screw thread 15 for the screw 14 is vertically aligned and the screw 14 is screwed or unscrewed from above in a vertical direction. Accordingly, the pneumatic screw driver 6 is so aligned that the longitudinal axis 13 of its screw driver bit 7 extends in a vertical direction.

The rest 17 or support may for example be a bench, some other industrial table facility or a conveyor belt in assembly plant.

By way of the holding device 5 the pneumatic screw driver 6 is suspended so that it can be moved vertically. Such vertical motion is indicated by a double arrow 18.

During use the pneumatic screw driver 6 is held in one hand by the operator and moved downward or upward in the desired manner as indicated by the double arrow 18. During such vertical motion the pneumatic screw driver 6 is guided by the holding device 5. Same conveniently also provides for guidance of the pneumatic screw driver 6 so that during the vertical movement it does not lose its spatial alignment, i.e. moved parallel to itself.

In order to ensure this the holding device 5 is provided with a cradle 22 carrying the pneumatic screw driver 6 and which during the vertical movement of the pneumatic screw driver 6 is also moved vertically while maintaining its spatial alignment. The cradle 22 is preferably constituted by a link of a parallelogram linkage 23 of the holding device 5 or is arranged on such a link, on which two mutually parallel superposed holding arms 24a and 24b are pivoted, which are rotatably connected on the side, which is opposite to an attachment foot 25, which is secured to the boom 4.

When the pneumatic screw driver 6 performs a vertical movement the holding arms 24a and 24b are moved about their pivotal attachment points on the attachment foot 25 upward or downward.

In order to provide for simplification of the handling of the pneumatic screw driver 6 and more especially to keep the effort necessary for the vertical movement 18 as low as possible, the instrumentality 1 is provided with a control device generally referenced 26.

The control device 26 comprises a drive means 27, which is able to produce an upwardly directed lifting force $F_H$ opposing the downwardly directed weight force $F_G$ of the pneumatic screw driver 6. More particularly, the drive means 27 may be so operated that the weight force $F_G$ is completely compensated independently of the instantaneous vertical position of the pneumatic screw driver 6 by the lifting force $F_H$ produced so that the pneumatic screw driver 6 is vertically force compensated in every set vertical position and keeps its vertical setting. The necessary operating force for lowering and raising the pneumatic screw driver 6 is hence extremely small.

Furthermore the control device 26 is provided with control means generally referenced 28 which render possible a control of the vertical force necessary during a screw driving operation and simply in a manner dependent on the operational state of the pneumatic screw driver 6 are able to decide whether the pneumatic screw driver 6 is thrust downward or not with a resulting thrust force $F_D$ of a predetermined amount.

The pneumatic screw driver 6 is supplied from a pressure medium source 32 with a compressed air. Its compressed air motor 12 is connected by way of an air line 33 with this pressure medium source 32. By means of a switch, not illustrated in detail, of the pneumatic screw driver 6, which actuates a switching valve provided on the pneumatic screw driver 6, or is in the form of a component thereof, it is possible for the supply of air from the pneumatic motor 12 to be started and stopped at will.

In the working embodiment the pneumatic screw driver 6 is so designed that the switching valve normally assumes a closed position and is only switched into the open setting, when the bit 7 or tool of the pneumatic screw driver 6 is thrust with a certain activating force against a screw 14 to be screwed up or unscrewed. Thus it is possible to do without a separate switch to be operated.

Somewhere along the air line 33 within or clear of the pneumatic screw driver 6a pressure sensor 34 is placed. Same is able to detect certain changes in the operating pressure obtaining in the air line 33.

The drive means 24 is constituted by a power cylinder in the working example, such cylinder being more especially a pneumatic power cylinder, which is able to be operated using compressed air as a driving pressure medium. The housing 35 of the drive means 27 has an attachment foot 25 pivotally mounted thereon and contains a piston 36 connected with a piston rod 37 extending out of the housing 35, such piston rod 37 being pivotally connected with one of the holding arms 24a and 24b, preferably the bottom one 24a.

In the interior of the housing 35 the piston 36 delimits a working chamber 38 on the side facing the piston rod 37. Owing to the weight of the pneumatic screw driver 6 and of the other components, acting on the piston rod 37, of the holding means 5 the piston rod 37 is urged in the outward direction and accordingly the piston 36 is urged in a direction to increase the volume of the working chamber 38.

A control valve means 42 of the control device 26 is supplied with the working pressure medium necessary for the operation of the drive means 27b way of a fluid line 43. Since in the present case it is a question of compressed air, the same pressure medium source 32 can be employed as is employed for the operation of the pneumatic screw driver 6.

By way of a line 44 the control valve means 42 is connected with the working chamber 38 for the transfer of fluid. The control means 42 preferably comprises a pressure regulator, which maintains the pressure medium from the line 44 and the pressure medium supplied to the working chamber 38 at a predetermined level.

The pressure regulator of the control means 42 may be so set that working fluid supplied on the primary side by way of the fluid line 43 takes effect in a manner independent from the instantaneous position of the piston 36 by way of the line 44 at all times with the same secondary pressure in the working chamber 38. The fluid forces acting on the piston 36 are accordingly independent of the current volume of the working chamber 38 to a substantial extent. Thus it is possible to so set the forces acting on the piston 36 using the pressure regulator that the above mentioned force compensation and balance between the lifting force $F_H$ and the weight force $F_G$ is obtained irrespectively of the vertical position of the pneumatic screw driver 6.

In principle a single drive means 27 in the form of a so-called single acting power cylinder would suffice for the above described manner of operation. The cylinder chamber opposite to the working chamber 38 could then be continuously connected with the atmosphere or by way of a high-speed venting valve. The use indicated in the drawing of a double acting working cylinder may however be advantageous in order to optimize the regulation function.

The control valve means 42 is preferably arranged on the holding device 5, as for example on the attachment foot 25 or, as in the working example, on the housing 35 of the drive means 27.

The pressure sensor 34 is directly or indirectly connected with the control valve means 42 for the transmission of signals therebetween. This connection is indicated in the drawing by in chained lines at 45.

The pressure sensor 34 can detect changes in the operating pressure in the air line 33 leading to the pneumatic motor 12. In a fashion dependent on the detected pressure change the pressure sensor 34 may produce one or more sensor signals, to which the control valve means 42 responds directly or indirectly by way of an intermediately placed electronic control unit.

The control device 26 is here so designed that when the pneumatic motor 12 is deactivated the working pressure in the working chamber 38 is so high that the above mentioned balancing action between the weight force $F_G$ and the lifting force $F_H$ is achieved. The operating pressure for the pneumatic motor 12 then assumes its nominal value.

If now the pneumatic motor 12 is activated—in the present case by thrusting the pneumatic motor 12 so that its screw driving tool 7 is forced against the screw 14 to be screwed tight or unscrewed—the operating pressure will be subject to a certain drop, which is detected by the pressure sensor 34. The pressure sensor 34 consequently produces a sensor signal corresponding to the pressure drop, which leads to such a switching over in the control valve means 42 that the working pressure obtaining in the working chamber 38 is reduced or discontinued, i.e. it is switched off. A suitable setting of the pressure regulator serves to set the level of the pressure obtaining in the working chamber after the switching over of the control valve means 42.

In the simplest possible case there may be a provision such that on detection of the pressure drop the working chamber 38 is completely vented. In any case the driving system of the invention makes it possible to cause a reduction or even a switching off of the lifting force $F_H$ due to the drive means 27 when a certain pressure drop takes place in the operating pressure for the pneumatic screw driver. Accordingly the compensation of forces present so far ceases and a resultant force $F_D$ will act on the pneumatic screw driver 6 so that the screw driving tool 7 is thrust firmly against the screw 14 to be driven without any action of the operator being necessary.

When the screw driving operation is terminated and the pneumatic motor 12 is accordingly switched off again, the nominal pressure will be built up again in the air line 33 immediately. This will cause a switching over of the control valve means 42 back into its initial position so that the lifting force $F_H$ will increase back to the value before putting the pneumatic screw driver 6 into operation. It is accordingly possible to ensure that after the increase, following the pressure drop, in the operating pressure, there is the same lifting force $F_H$ as was in existence before the fall in pressure. The pneumatic screw driver 6 may now be extremely readily positioned vertically with a compensation of forces and is available for the next screwing operation with the same effect.

The sensor signal responsible for the switching over of the control valve means 42 may be a pneumatic or an electrical signal, more particularly in accordance with the design of the pressure sensor 34. A design in which an electrical sensor signal is generated on the basis of the pressure drop detected is particularly to be recommended, such signal causing an electrical switching over of the control valve means 42.

What is claimed is:

1. In a device for controlling a vertical translation of a pneumatic tool supported by a holding device configured to allow the pneumatic tool to be translated in a vertical direction, the pneumatic tool being connected to an air supply line having a pressure associated therewith, the improvement comprising:
    a drive means for exerting a lifting force on the holding device for supporting the pneumatic tool; and
    a control means for adjusting the lifting force delivered by said drive means, said control means being configured to monitor the pressure in the air supply line.

2. The device as set forth in claim 1, wherein said control means increases the lifting force exerted by said drive means upon detecting a pressure drop in the air supply line.

3. The device as set forth in claim 2, wherein said control means maintains the lifting force exerted by said drive means after the pressure in the air supply line is increased.

4. The device as set forth in claim 1, wherein said control means includes a pressure sensor located on the air supply line for detecting changes in the pressure within the air supply line.

5. The device as set forth in claim 1, wherein:
    said drive means includes a working chamber adapted to be supplied with a fluid under an operating-pressure for producing the lifting force; and
    said control means includes a control valve configured to regulate said operating-pressure within said working chamber.

6. The device as set forth in claim 4, wherein said pressure sensor is configured to transmit signals related to the pressure in the air supply line to said control means.

7. The device as set forth in claim 5, wherein said control valve includes a pressure regulator.

8. The device as set forth in claim 5, wherein said control valve is arranged on said drive means.

9. The device as set forth in claim 5, wherein said control valve is arranged on the holding device.

10. The device as set forth in claim 1, wherein the control means is configured to adjust the lifting force delivered by said drive means so that a weight force associated with the pneumatic tool is completely compensated while the pneumatic tool is in an inactive state.

11. The device as set forth in claim 1, wherein said drive means comprises a single acting power cylinder.

12. The device as set forth in claim 1, wherein said drive means comprises a double acting power cylinder.

13. The device as set forth in claim 1, wherein the holding device includes a means configured to receive the pneumatic tool.

14. The device as set forth in claim 1, wherein the holding device includes a parallelogram linkage.

15. The device as set forth in claim 1, wherein the drive means is configured to be pneumatically operated.

16. A pneumatic tool comprising:
    an air supply line for providing compressed air having a pressure associated therewith;
    a pneumatic screw driver connected to said air supply line for operation by the compressed air;
    a holding device for supporting said screw driver, said holding device being configured to allow said screw driver to be translated in a vertical direction;
    a drive means for exerting a lifting force on said holding device for supporting said screw driver; and
    a control means for adjusting said lifting force delivered by said drive means, said control means being configured to monitor said pressure in said air supply line.

17. The pneumatic tool as set forth in claim 16, wherein said control means increases said lifting force exerted by said drive means upon detecting a pressure drop in said air supply line.

18. The pneumatic tool as set forth in claim 17, wherein said control means maintains said lifting force exerted by said drive means after said pressure in said air supply line is increased.

19. The pneumatic tool as set forth in claim 16, wherein said control means includes a pressure sensor located on said air supply line for detecting changes in said pressure within said air supply line.

20. The pneumatic tool as set forth in claim 16, wherein:
    said drive means includes a working chamber adapted to be supplied with a fluid under an operating-pressure for producing said lifting force; and
    said control means includes a control valve configured to regulate said operating-pressure within said working chamber.

21. The pneumatic tool as set forth in claim 19, wherein said pressure sensor is configured to transmit signals related to said pressure in said air supply line to said control means.

22. The pneumatic tool as set forth in claim 20, wherein said control valve includes a pressure regulator.

23. The pneumatic tool as set forth in claim 20, wherein said control valve is arranged on said drive means.

24. The pneumatic tool as set forth in claim 20, wherein said control valve is arranged on said holding device.

25. The pneumatic tool as set forth in claim 16, wherein said control means is configured to adjust said lifting force delivered by said drive means so that a weight force associated with said pneumatic screw driver is completely compensated while said pneumatic screw driver is in an inactive state.

26. The pneumatic tool as set forth in claim 16, wherein said drive means comprises a single acting power cylinder.

27. The pneumatic tool as set forth in claim 16, wherein said drive means comprises a double acting power cylinder.

28. The pneumatic tool as set forth in claim 16, wherein said holding device includes a means configured to receive said pneumatic screw driver.

29. The pneumatic tool as set forth in claim 16, wherein said holding device includes a parallelogram linkage.

30. The pneumatic tool as set forth in claim 16, wherein said drive means is configured to be pneumatically operated.

* * * * *